Oct. 11, 1938.  C. C. FARMER  2,132,940
AIR STRAINER
Original Filed Dec. 22, 1934
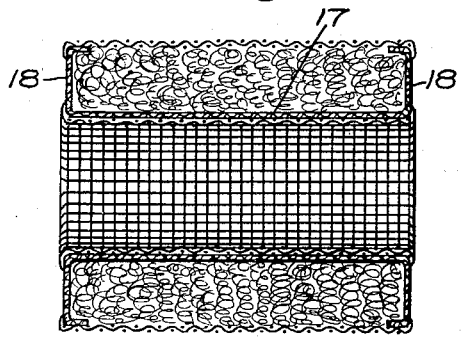
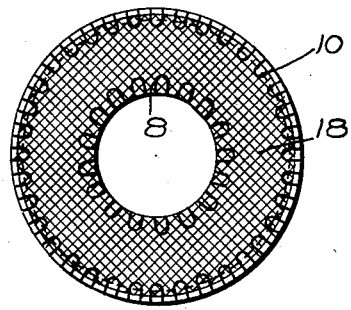
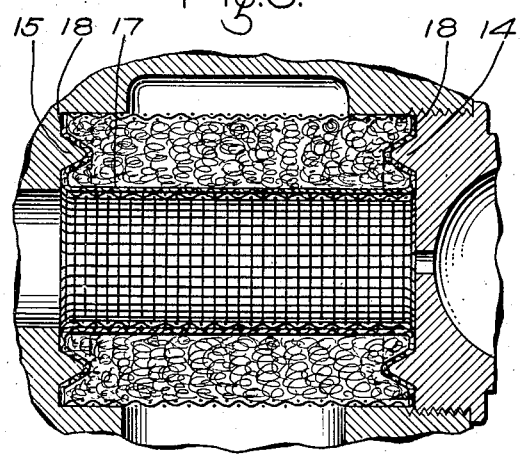
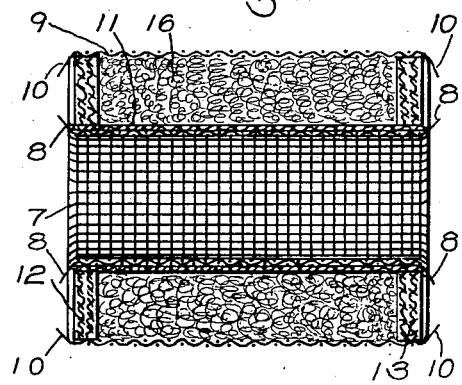
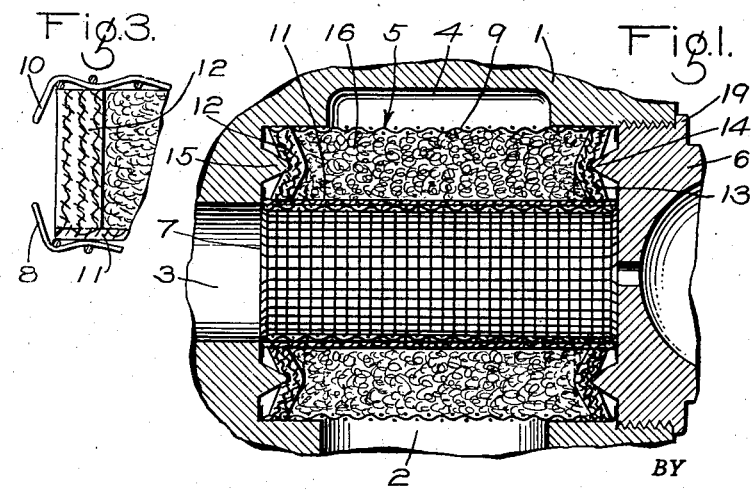
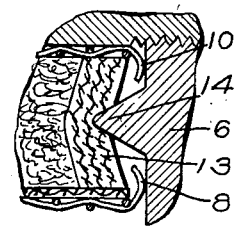
INVENTOR
CLYDE C. FARMER
BY
ATTORNEY Patented Oct. 11, 1938

2,132,940

UNITED STATES PATENT OFFICE 2,132,940

AIR STRAINER

Clyde C. Farmer, Pittsburgh, Pa., assignor to The Westinghouse Air Brake Company, Wilmerding, Pa., a corporation of Pennsylvania Application December 22, 1934, Serial No. 758,779
Renewed April 15, 1937

11 Claims. (Cl. 183—49)

This invention relates to fluid pressure systems and more particularly to means for cleansing fluid supplied to the system.

The fluid pressure operated devices employed in fluid pressure brake systems are subject to brake pipe pressure and are operated by variations therein for controlling the application and release of the brakes. If fluid under pressure supplied to one of these valve devices should contain foreign matter, such foreign matter will pass with the fluid into the working parts of the valve device where it may accumulate and eventually cause sluggish action of the valve device or in some cases result in complete failure of said device.

Fluid supplied to a fluid pressure system often contains particles of foreign matter so minute that they are difficult to strain out of the fluid and these particles accumulate on the working surfaces of the valve devices of the system and through their abrasive action cause excessive wear and possibly ultimate failure of the valve devices.

The principal object of the invention is to provide in a fluid pressure operated apparatus improved means for freeing the fluid under pressure supplied to said apparatus of foreign matter.

Another object is to provide a strainer device, adapted to remove foreign matter from the fluid supplied to a fluid pressure system, of improved construction whereby all fluid supplied to said valve device is made to pass through said strainer device where it is thoroughly cleansed before it can flow to other parts of the system, thus eliminating the possibility of the faulty operation of the movable parts of the system due to dirt and moisture.

A still further object is to provide an improved construction whereby a strainer which is adapted to be received in a bore in a casing is firmly secured in the bore regardless of variations due to manufacturing tolerances.

Other objects and advantages will appear in the following more detailed description of the invention.

In the accompanying drawing, Fig. 1 is a sectional view of a portion of a casing of a fluid pressure operated device showing one form of fluid strainer constructed in accordance with my invention and means for releasably retaining same in position in the valve device; Fig. 2 is a mid-sectional view of the strainer shown in Fig. 1 dismounted from the fluid pressure operated device; Fig. 3 is an enlarged fragmentary sectional view showing a portion of the end of the strainer illustrated in Fig. 2 before being applied to the valve device; Fig. 4 is an enlarged fragmentary sectional view showing the manner in which the retaining plug serves to secure the strainer device of Fig. 1 in the valve device and to effect a leak-proof seal at the end of the strainer; Fig. 5 is a view similar to Fig. 1, showing another form of strainer embodying features of the invention; Fig. 6 is a mid-sectional view of the strainer illustrated in Fig. 5 dismounted from the valve device; and Fig. 7 is an end elevational view of the strainer devices of Figs. 2 and 6.

Referring to the embodiment of my invention as illustrated in Fig. 1, the reference character 1 indicates a portion of a casing of a fluid pressure valve device having a fluid conducting passage 2, which may be considered as leading to the brake pipe (not shown) and a fluid conducting passage 3 which may lead to the working parts (not shown) of the valve device. Intermediate said passages is a bore 4 which is open at one end and contains the strainer device 5 which is inserted through the open threaded end of the bore and which is secured within said bore by means of a screw plug 6 having screw-threaded connection with the threaded wall of the bore.

The strainer device is preferably of tubular form and comprises a tubular retainer 7 preferably formed of wire mesh having outwardly directed end lugs 8 and also comprises a similar tubular wire mesh retainer 9 which surrounds and is spaced from the retainer 7 and has inwardly directed end lugs 10, there being a substantial annular space provided between the lugs 8 and 10.

The blank of wire mesh from which the retainers 7 and 9 are formed is made of a width equal to the length of the finished strainer device, the strands of the mesh which extend in the direction of the width of the blank projecting beyond each side of the blank to form the bendable lugs 8 and 10. The wire mesh may be made of rust resisting material or it may be made of steel and galvanized.

Surrounding the inner retainer 7 is a sleeve 11 of porous material, which in the present embodiment of the invention, is of relatively thin felt, so as not to offer any substantial resistance to the flow of fluid therethrough. The space between the sleeve 11 and the outer retainer 9 is packed with a suitable straining material, such as curled hair 16, which is confined at the ends of the strainer by means of relatively thick washers 12 and 13, made preferably of felt, and which are retained in position by the lugs 8 and 10.

As hereinbefore mentioned, the fluid strainer 5 is held in position within the bore 4 by the application of the screw plug 6 which has screw-threaded engagement with the casing 1 within said bore. The inner end of the plug is provided with an annular rib 14 which engages the washer 13 in the annular space between the lugs 8 and 10 and flexes same inwardly as the plug is threaded into the casing. At the same time a similar rib 15 formed at the base of the bore 4 similarly engages the washer 12 in the annular space between the lugs 8 and 10 and flexes same inwardly. The washers being made of felt or other suitable material, the ribs 14 and 15 become partially embedded within the washers and due to this, there will be no free open space to permit leakage of uncleansed fluid from passage 2 to passage 3, past the end of the strainer device.

The flexing of the washers 12 and 13 compresses th curled hair 16 and due to this the curled hair will at all times remain in close engagement with said washers, so as to effectively clean the fluid passing through the strainer device, near the ends thereof.

It will be apparent from the foregoing that by my invention, fluid is made to pass through the straining material before it can flow to the working parts of the valve device and it will thus be seen that thorough cleaning of the fluid is assured, the curled hair 16 catching the larger particles of foreign matter and the felt sleeve 11 catching the particles which are too fine to be caught by the curled hair.

By referring to Fig. 3, it will be seen that when the strainer device is made up, the lugs 8 and 10 are not bent over the ends of the strainer device into close contact with the outer face of the washers 12 and 13, but are bent only sufficiently to confine the washers, there being space left between portions of said lugs and the outer face of said washers. The body of the strainer device is made of a length such that it is substantially the same as the length of the space in which it is received in the casing 1, between the end of the bore 4 and the inner face of the screw plug 6 when screwed home, that is, with the flange 19 provided on the plug engaging the casing 1, for a reason which will presently appear.

As the plug 6 is threaded into the casing, the lugs 8 and 10 at the inner end of the strainer are engaged by the casing at the end of the bore 4 and the lugs 8 and 10 at the outer end of the strainer are engaged by the inner face of the plug 6. Being bendable, the lugs are bent inwardly by this engagement until the plug is screwed home, at which time the lugs will have been bent inwardly, somewhat as shown in Fig. 4. Thus, the strainer device is firmly held in position by the metal-to-metal contact of the strainer mesh with the casing at the end of the bore 4 and with the plug 6, and it will be seen that by reason of the lugs 8 and 10 being bendable, the strainer is securely held, regardless of slight variations due to the usual manufacturing tolerances.

It will be understood that when brake pipe pressure is reduced to effect an application of the brakes, the consequent flow of fluid under pressure from passage 3 to passage 2 through the strainer will tend to detach and carry away from the strainer any foreign matter which may have accumulated therein, and thus the strainer is rendered self-cleaning.

If desired, instead of providing the sleeve 11 and felt washers 12 and 13 illustrated in Figs. 1 and 2, a felt sleeve 17 may be provided having integral therewith outwardly directed end flanges 18, as shown in the modification of my invention illustrated in Figs. 5, 6 and 7 the end flanges being adapted to cooperate with the ribs 14 and 15 to form an air-tight seal, the flexing of the flanges acting to compress the curled hair and to direct the flow of fluid passing through the strainer device at the ends thereof.

It will be understood that although the invention has been described in connection with a valve device of a fluid pressure brake equipment it may be employed in any other type of fluid pressure equipment or any valve device associated therewith.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a strainer, in combination, a hollow wire mesh core, the strands of the mesh extending in the direction of the length of said core projecting beyond the ends of said core and being bent outwardly to form lugs, a hollow wire mesh body portion surrounding said core and spaced therefrom, the strands of the mesh extending in the direction of the length of said body portion projecting beyond the ends of said body portion and being bent inwardly to form lugs, the ends of the lugs of said core and the lugs of said body portion being spaced apart transversely of said core and body, a mass of straining material packed in the space between said core and body portion, and a ring of flexible material at each end of the strainer interposed between said core and body portion and retained in position by said lugs.

2. In a strainer, in combination, a hollow wire mesh core, the strands of the mesh extending in the direction of the length of said core projecting beyond the ends of said core and being bent outwardly to form lugs, a hollow wire mesh body portion surrounding said core and spaced therefrom, the strands of the mesh extending in the direction of the length of said body portion projecting beyond the ends of said body portion and being bent inwardly to form lugs, a sleeve of pervious material surrounding said core, a mass of straining material packed in the space between said sleeve and body portion, and a ring of flexible material at each end of the strainer interposed between said sleeve and body portion and retained in position by said lugs.

3. The combination with a casing having a bore through which fluid under pressure may flow, of a strainer contained in said casing for removing foreign matter from fluid flowing through said bore, said strainer comprising a hollow foraminous core, a foraminous body portion surrounding said core and spaced therefrom, said core and body portion having at one end yieldable lugs extending in a direction across said space, a mass of straining material packed in the space between said core and body portion and retained by said lugs, and a retaining element having screw-threaded engagement with said casing within said bore for securing said strainer in the casing, said lugs being adapted to be engaged and bent by said element as said element is screw-threaded into said casing.

4. The combination with a casing having a bore through which fluid under pressure may flow, of a strainer contained in said casing for removing foreign matter from fluid flowing through said bore, said strainer comprising a hollow foraminous core, a foraminous body portion surrounding said core and spaced therefrom, straining material packed in the space between said core and body portion, lugs on said core and body portion bent to retain the straining material within said space, a member secured to said casing and engaging said lugs for holding the strainer in place, said lugs being yieldable to said member when in securing the member to the casing there is movement of the member relative to the strainer after the member is in engagement with the lugs.

5. In combination a casing having a communication through which fluid is adapted to flow, a strainer interposed in said communication for removing foreign matter from the fluid as it flows through said communication, said strainer comprising a hollow foraminous metallic core, a foraminous metallic body portion surrounding said core and spaced therefrom, straining material packed in the space between the core and body portion, lugs at one end of the core and body portion retaining the straining material in said space, and a member secured to said casing and engaging said lugs to hold said strainer in place in the casing, said lugs being yieldable to the movement of the member as the member is being secured to the casing.

6. In combination a casing having a communication through which fluid is adapted to flow, a strainer interposed in said communication for removing foreign matter from the fluid as it flows through said communication, said strainer comprising a tubular core of wire mesh, a tubular wire mesh body portion surrounding said core and spaced therefrom, straining material packed in the space between the core and body portion, lugs at one end of the core and body portion retaining the straining material in said space, said lugs consisting of the end portions of only the longitudinal strands of the wire mesh, and a member having screw-threaded connection with the casing for securing the strainer in said casing, said member as it is being moved toward its final securing position engaging said lugs and said lugs being yieldable to said member as the member is moved to its final securing position.

7. In a strainer, in combination, spaced annular members arranged one within the other and each consisting of wire mesh, straining material contained in the space between said members, and spaced lugs on each of said members for retaining said material in the space, said lugs consisting of the end portions of certain of the strands of the wire mesh bent to extend in a direction across said space, the length of said lugs being less than one half of the width of the space between said members, and the straining material being exposed between the ends of said lugs for yieldable contact with a portion of a mounting for the strainer.

8. In a strainer, in combination, a hollow core of wire mesh having the ends of only the longitudinal strands thereof bent outwardly to form retaining lugs, a hollow member of wire mesh surrounding said core and spaced therefrom and having the ends of only the longitudinal strands thereof bent inwardly to form retaining lugs and straining material packed in the space between said core and member, said lugs being of a length less than one half the width of said space and adapted to retain the straining material between the core and member.

9. In a strainer, in combination, spaced tubular shaped members made of wire mesh and arranged one within the other, straining material packed in the space between said members and a ring of flexible material interposed between said members at each end of said strainer.

10. In a strainer, in combination, spaced tubular shaped members made of wire mesh and arranged one within the other, and straining material interposed in the space between said members, said straining material comprising felt washers at the ends of said members and a less compact material between said washers.

11. In a strainer, in combination, spaced tubular shaped members made of wire mesh and arranged one within the other, and straining material interposed in the space between said members, said straining material comprising felt washers at the ends of said members and a less compact material between said washers, the end loops of said wire mesh being bent over said felt washers.

CLYDE C. FARMER.